United States Patent
Eaton et al.

(10) Patent No.: US 10,841,163 B2
(45) Date of Patent: Nov. 17, 2020

(54) AUTOINITIALIZATION OF CLUSTERED STORAGE

(71) Applicant: EMC IP Holding Company LLC, Hopkinton, MA (US)

(72) Inventors: Matthew Eaton, Mansfield, MA (US); Michael Burns, Shrewsbury, MA (US); Nigel Stuart, East Boston, MA (US); Matthew Jean, Shirley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 16/175,406

(22) Filed: Oct. 30, 2018

(65) Prior Publication Data

US 2020/0136909 A1    Apr. 30, 2020

(51) Int. Cl.
*H04L 12/24* (2006.01)
*H04L 29/08* (2006.01)

(52) U.S. Cl.
CPC ...... *H04L 41/0889* (2013.01); *H04L 41/0873* (2013.01); *H04L 41/0886* (2013.01); *H04L 67/1097* (2013.01)

(58) Field of Classification Search
CPC ............. H04L 41/0889; H04L 41/0873; H04L 41/0886; H04L 67/1097; H04L 41/12
See application file for complete search history.

(56) References Cited

U.S. PATENT DOCUMENTS 9,778,865 B1    10/2017    Srinivasan et al.
10,120,887 B1    11/2018    Patel et al.
2004/0003111 A1*    1/2004    Maeda .................... H04L 45/02
                                                         709/237
2014/0006597 A1*    1/2014    Ganguli ................. G06F 9/5072
                                                         709/224
2016/0019125 A1*    1/2016    Madduri ............. G06F 11/2005
                                                         714/4.11

(Continued)

OTHER PUBLICATIONS

Horan, et al., "Unified Initialization Utility," U.S. Appl. No. 13/630,093, filed Sep. 28, 2012.

(Continued)

*Primary Examiner* — Wing F Chan
*Assistant Examiner* — Billy H Ng
(74) *Attorney, Agent, or Firm* — BainwoodHuang

(57) ABSTRACT

Techniques are presented for clustering data storage including (a) announcing, using zeroconf, to a local network, a service provided by a DSA and an unreserved state of the DSA, the service being of a clusterable data storage type, (b) receiving a cluster command from a configuration management device connected to the local network, the cluster command directing the DSA to join a storage cluster to present combined storage of the DSA and at least one other DSA, and (c) in response to receiving the cluster command: (1) announcing to the local network via L2 multicasting that the DSA has entered a reserved state using zeroconf, (2) afterwards, performing configuration operations including updating system parameters, resulting in the DSA becoming part of the storage cluster, and (3) while in the reserved state, receiving another cluster command directing the DSA to join another storage cluster, and, in response, refusing the other cluster command.

17 Claims, 7 Drawing Sheets

(56) References Cited

U.S. PATENT DOCUMENTS

2016/0028587 A1* 1/2016 Garg .................. H04L 41/0806
709/224

OTHER PUBLICATIONS

Khokhar, et al., "Configuring a Data Storage System by Analyzing and Grouping Activity Data of Multiple Luns," U.S. Appl. No. 15/499,426, filed Apr. 27, 2017.

Zhang, et al., "Systems and Methods of Synchronizing Configuration Information in a Clustered Storage Environment," U.S. Appl. No. 15/965,156, filed Apr. 27, 2018.

Zhao, et al., "Versioning a Configuration of Data Storage Equipment," U.S. Appl. No. 16/168,941, filed Oct. 24, 2018.

Tylik, et al., "Supporting Non-Disruptive Movement of a Logical Volume of Non-Volatile Data Storage Between Storage Appliances," U.S. Appl. No. 16/176,819, filed Oct. 31, 2018.

Cheshire, et al., "Dynamic Configuration of IPv4 Link-Local Addresses," RFC 3927, May 2005, 33 pages, Internet Engineering Task Force, retrieved from <https://tools.ietf.org/html/rfc3927> on Jan. 3, 2019.

* cited by examiner

AUTOINITIALIZATION OF CLUSTERED STORAGE

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Some data storage systems may be arranged in clusters so that storage provided by all of the clustered data storage systems may be combined into a single storage pool that is presented to hosts.

SUMMARY

Unfortunately, there are deficiencies in present clustered data storage systems. For example, if an entity installs several data storage systems and wishes to configure them into one or more clusters, it may be difficult to configure the system in such a manner. Typically, an expert must directly connect to the physical network where the data storage systems are installed and individually set up each data storage system and then configure each one to be within a particular cluster. This can be a time-consuming process, and the expert must be connected to the physical network the entire time, which is not an efficient use of the expert's time.

Thus, it would be desirable to pre-configure the data storage systems to automatically self-initialize upon connecting to the physical network and to minimize the amount of expert configuration needed while the expert is connected to the physical network. This may be accomplished by utilizing zero configuration networking (zeroconf) techniques to initialize each data storage system with a link local address and to announce that it is available for clustered data storage. However, since configuration of each data storage system to join a cluster can still take several minutes, to ensure that there are no conflicts between multiple users attempting to configure clusters simultaneously, each data storage system is also pre-configured to announce its cluster configuration state to the local network and to immediately change its cluster configuration state to a reserved state upon being selected to join a cluster. Rules can be implemented to prevent a data storage system in a reserved cluster configuration state from being permitted to join another cluster. In addition, because each data storage system announces its availability and its cluster configuration state, a device attached to the local network is able to display a list of all data storage systems on the local network available to join a new or preexisting storage cluster. A user is then easily able to select one or more available data storage systems to initiate a new cluster or to join a preexisting cluster. In addition, once a cluster is initialized, a user on a layer 3 network (i.e., not limited to just the local physical network) is able to access a data storage system of that cluster and to view all data storage systems that are currently available to join that cluster. The user can also add such an available data storage system to a cluster even when not directly connected to the physical local network.

In one embodiment, a method of clustering data storage performed by a data storage apparatus (DSA) is provided. The method includes (a) announcing, using zero-configuration networking (zeroconf), to an L2 local network, a service provided by the DSA and an unreserved state of the DSA, the service being of a clusterable data storage type, (b) receiving a cluster command from a configuration management device connected to the L2 local network, the cluster command directing the DSA to join a storage cluster to present combined storage of the DSA and at least one other DSA on the L2 local network, and (c) in response to receiving the cluster command: (1) announcing to the local network via L2 multicasting that the DSA has entered a reserved state using zeroconf, (2) after announcing that the DSA has entered the reserved state, performing configuration operations including updating system parameters, resulting in the DSA becoming part of the storage cluster, and (3) while in the reserved state, receiving another cluster command directing the DSA to join another storage cluster, and, in response, refusing the other cluster command. A system, apparatuses, and computer program products for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for pre-configuring data storage systems to automatically self-initialize upon connecting to a physical network and to minimize the amount of expert configuration needed while the administrator is connected to the physical network. This result may be accomplished by utilizing zero configuration networking (zeroconf) techniques to initialize each data storage system with a link local address and to announce that it is available for clustered data storage. However, since configuration of each data storage system to join a cluster can still take several minutes, to ensure that there are no conflicts between multiple users attempting to configure clusters simultaneously, each data storage system is also pre-configured to announce its cluster configuration state to the local network and to immediately change its cluster configuration state to a reserved state upon being selected to join a cluster. Rules can be implemented to prevent a data storage system in a reserved cluster configuration state from being permitted to join another cluster. In addition, because each data storage system announces its availability and its cluster configuration state, a device attached to the local network is able to display a list of all data storage systems on the local network available to join a new or preexisting storage cluster. A user is then easily able to select one or more available data storage systems to initiate a new cluster or to join a preexisting cluster. In addition, once a cluster is initialized, a user on a layer 3 network (i.e., not limited to just the local physical network) is able to access a data storage system of that cluster and to view all data storage systems that are currently available to join that cluster. The user can also add such an available data storage system to a cluster even when not directly connected to the physical local network.

Figure 1:
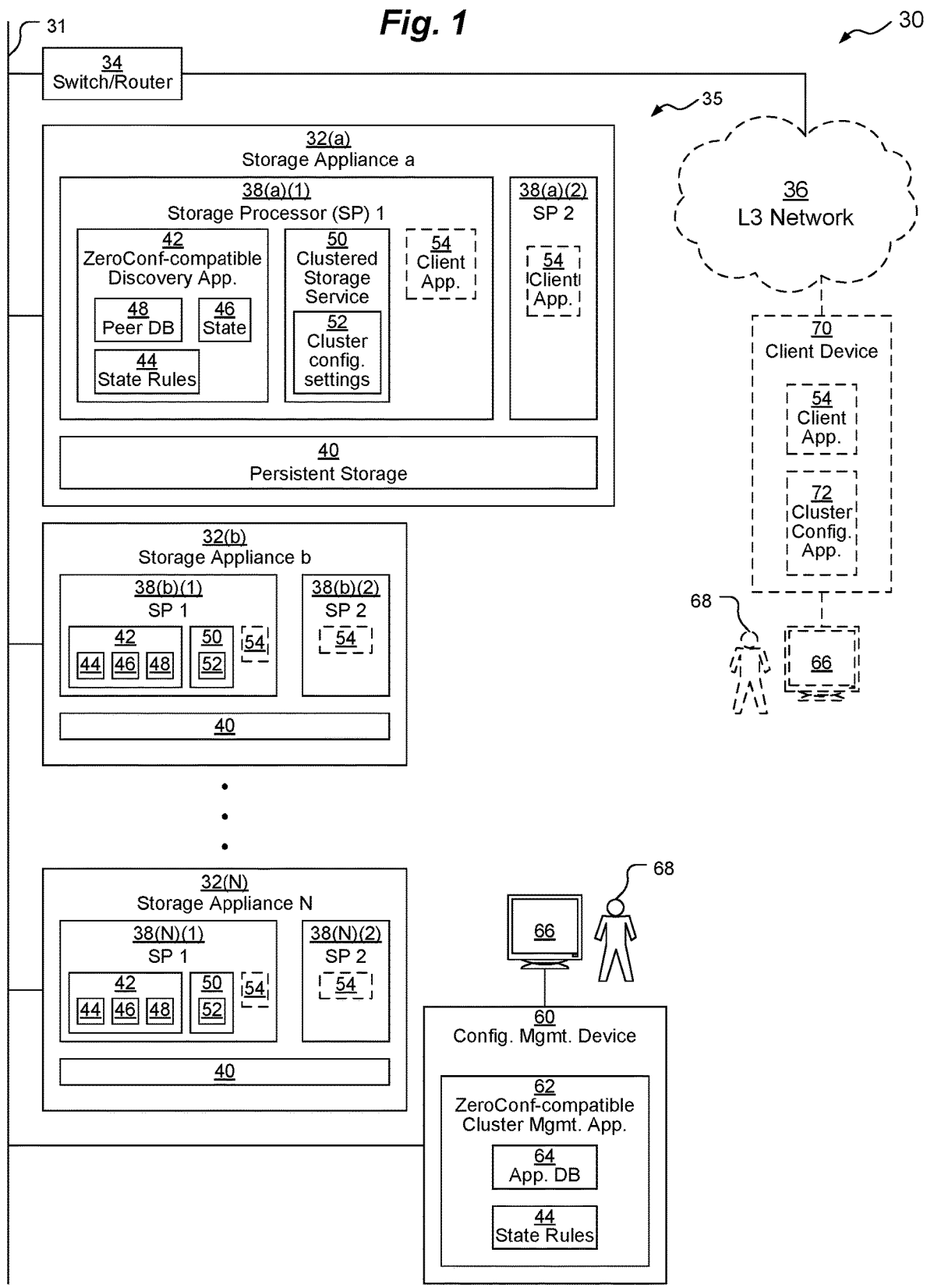
FIG. 1 is a block diagram depicting an example system and apparatuses for use in connection with various embodiments.

FIG. 1 depicts a system 30 including a plurality of data storage appliances (DSAs) 32 (depicted as storage appliances 32(a), 32(b), ..., 32(N)) connected to a local network 35. Local network 35 also includes a Layer 2 (link layer) switch 34, a set of interconnects 31 (e.g., Ethernet cables, wireless connections, etc.), and a configuration management device 60. All devices 32, 34, 60 of the local network 35 are connected to each other using layer 2 protocols (although, in some embodiments, some of the devices 32, 34, 60 may at some point communicate with each other using higher level protocols).

In an example embodiment, the DSAs 32 and switch 34 may be rack-mountable devices mounted on a single server rack (e.g., a 42 U server rack), and interconnects 31 are a set of Fibre Channel or Ethernet cables mounted on the server rack. In an example, each DSA 32 is a clusterable data storage system rack server, such as a Cyclone data storage array produced by Dell/EMC of Hopkinton, Mass. In one embodiment, each DSA 32 is a 2 U rack server, and there may be up to 20 DSAs 32 installed within local network 32.

Switch 31 is configured to forward all multicast L2 frames and multicast link-local packets that it receives to all devices 32, 60 on the local network. In some embodiments, switch 34 may function as a router that also connect to an L3 (network layer) network 36. In these embodiments, one or more client devices 70 may communicatively connect to L3 network 36.

Each DSA 32 includes one or more storage processors 38 configured to provide access to persistent storage 40 of that DSA 32. In some embodiments, as depicted, each DSA 32 has two SPs 38 for redundancy and performance reasons. Thus, for example, as depicted, storage appliance 32(a) has two SPs 38(a)(1), 38(a)(2), storage appliance 32(b) has two SPs 38(b)(1), 38(b)(2), and storage appliance 32(N) has two SPs 38(N)(1), 38(N)(2). Each SP 38 may be thought of as a computing device, although the persistent storage 40 may be directly accessed by either SP 38 of a DSA 32. See below in connection with FIG. 2 for more detail on the internal structure of an SP 38. In some embodiments, a high-speed inter-SP bus (not depicted) may connect the SPs 38 of a DSA 32. Persistent storage 40 may include any kind of persistent storage devices, such as, for example, hard disk drives, solid-state storage devices (SSDs), flash drives, etc.

In each DSA 32, one SP 38 may be configured as a primary SP 38 for purposes of cluster management. As depicted, SP 38(a)(1) is the primary SP 38 for DSA 32(a), SP 38(b)(1) is the primary SP 38 for DSA 32(b), and SP 38(N)(1) is the primary SP 38 for DSA 32(N). Taking SP 38(a)(1) as an example of a primary SP 38, SP 38(a)(1) runs a Zeroconf-compatible Discovery Application 42 and a clustered storage service 50. Zeroconf-compatible Discovery Application 42 uses zeroconf techniques to obtain a unique link-local address and to announce the availability of the clustered storage service 50 provided by the SP 38(a)(1).

As is well-known in the art, zeroconf is a set of technologies that automatically creates a usable computer network based on TCP/IP when networked devices are interconnected without requiring manual operator intervention or special configuration servers. As is also well-known, zeroconf includes three core technologies: automatic assignment of link-local addresses for networked devices, automatic distribution and resolution of computer hostnames, and automatic location of network services. Link-local addresses are special IP addresses within either the 169.254.0.0/16 or fe80::/10 blocks. The switch 34 is configured to pass packets with link-local addresses along within local network 35, it is configured to not route packets with link-local addresses outside of local network 35 (i.e., these packets are not forwarded to L3 network 36). Any implementation of zeroconf may be used, depending on the embodiment, such as, for example, Avahi or Apple Bonjour.

Zeroconf-compatible Discovery Application 42 is also configured to maintain a state 46 according to a set of state rules 44 and to maintain a peer database (DB) 48 that stores service and state information for all DSAs 32 on the local network 35 that announce services compatible with the clustered storage service 50. Clustered storage service 50 is configured to allow several DSAs 32 to join together in a cluster so that the persistent storage 40 of several DSAs 32 can be shared and presented to the outside world as one large storage system. Clustered storage service 50 maintains cluster configuration settings 52 to ensure proper operation. In some embodiments, once fully-configured, each cluster presented by a clustered storage service 50 has a true L3 IP address so that its shared storage can be accessed by client applications 54 running on client devices 70 on the L3 network 36 outside the local network 35. In some embodiments, client applications 54 may run within the local network as well, such as on any SP 38 of any DSA 32.

Configuration management device 60 may be any kind of computing device that connects to local network 35, such as, for example, a personal computer, workstation, server computer, enterprise server, DSS rack server, laptop computer, tablet computer, smart phone, mobile computer, etc. In an example, Configuration management device 60 is a laptop computer. In some embodiments, configuration management device 60 only connects to local network temporarily during an initial cluster configuration phase. Configuration management device 60 connects to a display device 66 (e.g., a CRT, LCD, plasma, or LED monitor) and other user interface circuitry (not depicted) so that it may be controlled by a human administrator 68. Configuration management device 60 runs a Zeroconf-compatible Cluster Management Application 62, which is configured to store a set of state rules 44 and to maintain an appliance DB 64 that stores service and state information for all DSAs 32 on the local network 35 that announce services compatible with the clustered storage service 50.

In operation, as each DSA 32 boots up and connects to local network 35, it runs Zeroconf-compatible discovery application 42 on one of its SPs 38. Taking SP 38(a)(1) of DSA 32(a) as an example, Zeroconf-compatible discovery application 42 runs and obtains a link-local IP address using zeroconf (e.g., using techniques described in RFC 3927 "Dynamic Configuration of IPv4 Link-Local Addresses" by Cheshire, et al., published by the Network Working Group in May 2005). Zeroconf-compatible discovery application 42 also advertises the availability of the clustered storage service 50 and a local state 46 using zeroconf. Initially, the state 46 is set to a value of "Unconfigured," which is an unreserved state indicating that it is available to be added to a storage cluster. Since the Zeroconf-compatible discovery application 42 running on each DSA 32 announces its state 46 and service 50 to the entire local network 35 using multicast, each Zeroconf-compatible discovery application 42 is able to receive the announcements from each of the other DSAs 32. Therefore, Zeroconf-compatible discovery application 42 running on each DSA 32 collates all the received announcements and stores the information in peer DB 48. Thus, peer DB 48 stores the state 46 and services announced by each DSA 32, as well as the link-local (or other) IP address for each.

When Configuration management device 60 connects to local network 35, Zeroconf-compatible Cluster Management Application 62 listens for multicast announcements featuring services of a type compatible with Clustered storage service 50. Once it locates a DSA 32(*a*) that features such a service 50, Zeroconf-compatible Cluster Management Application 62 issues a request to that DSA 32(*a*) over network 35 for the information in its peer DB 48. The Zeroconf-compatible discovery application 42 running on that DSA 32(*a*) returns the information from its peer DB 48 to the Zeroconf-compatible Cluster Management Application 62, which stores the information within appliance DB 64. Zeroconf-compatible Cluster Management Application 62 is then able to display a list of available cluster-compatible DSAs 32 (i.e., DSAs 32 whose state 46 is not a reserved state) to administrator 68 via display 66. Administrator 68 is then able to select one or more available DSAs 32 to be joined together into a single storage cluster. Zeroconf-compatible Cluster Management Application 62 then instructs the Zeroconf-compatible discovery application 42 on each of the DSAs 32 that were selected to be joined into a cluster to change its state 46 to a reserved state (e.g., a "configuring" state) so that it is not accidentally added to another cluster. Then each of the DSAs 32 that were selected to be joined into a cluster updates its state 46 and begins becoming configured to join the cluster, which includes having various cluster configuration settings 52 updated in coordination with other members of the cluster and the Zeroconf-compatible Cluster Management Application 62.

Once a cluster (not depicted) is configured, the persistent storage 40 of the several DSAs 32 of that cluster may be presented as unified storage via a single L3 (non-link-local) IP address. At that point, an administrator or other administrator 68 at a client device 70 on L3 network 36 may operate cluster configuration application 72 to add additional available DSAs 32 (i.e., having a state 46 that is unreserved) to the configured cluster, operating in a similar manner as Zeroconf-compatible Cluster Management Application 62 but without having access to L2 multicast information. Since there may be several cluster configuration applications 72 as well as the Zeroconf-compatible Cluster Management Application 62 running simultaneously at various different locations, it is beneficial that the state 46 of any DSA 32 that is being added to any cluster is immediately changed to a reserved state so that no other cluster configuration application 62, 72 can simultaneously try to add the same DSA 32 to a different cluster.

Figure 2:
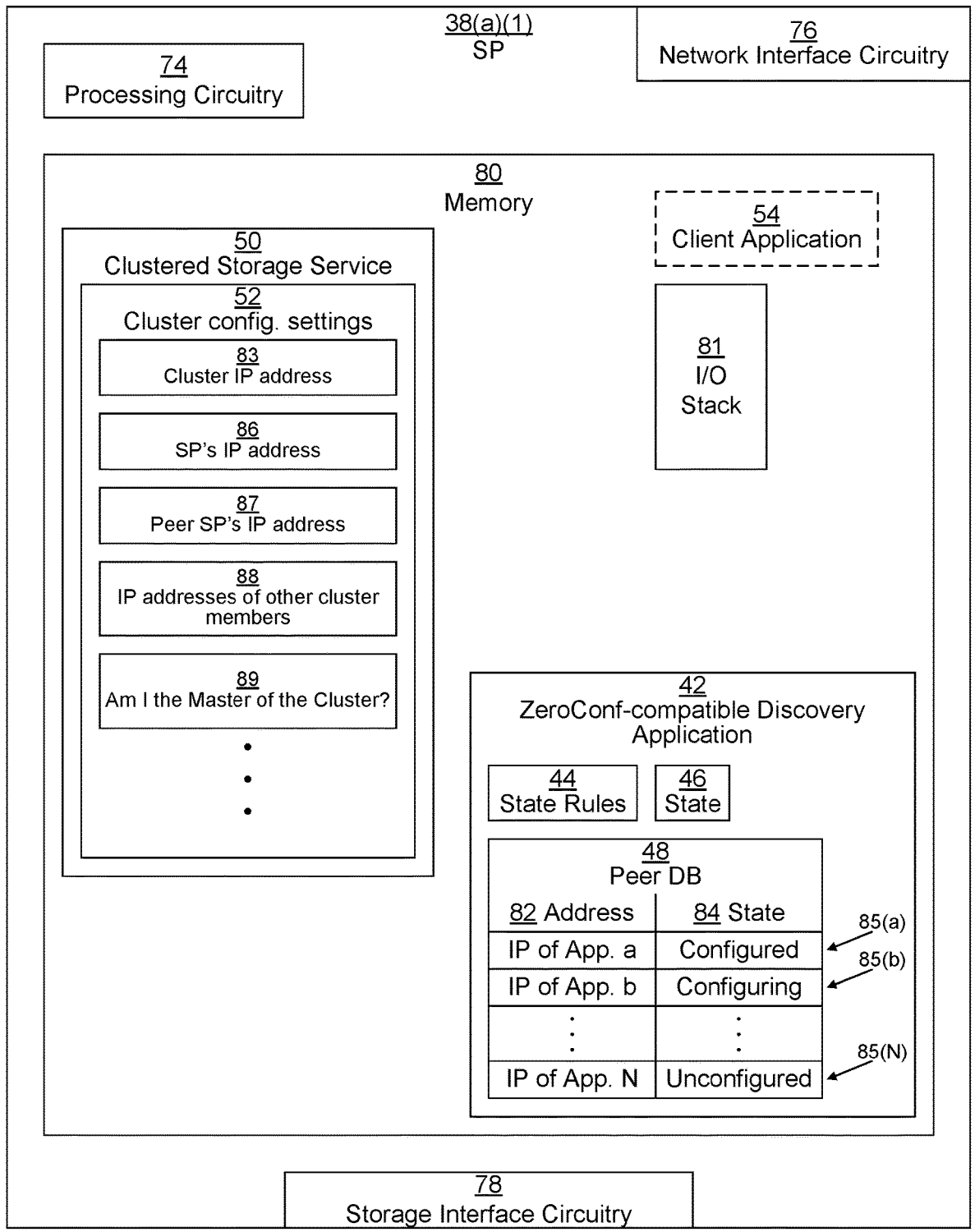
FIG. 2 is a block diagram depicting an example apparatus for use in connection with various embodiments.

FIG. 2 depicts an example SP 38(*a*)(1) in more detail. SP 38(*a*)(1) includes processing circuitry 74, network interface circuitry 76, storage interface circuitry 78, and memory 80. In some embodiments, SP 38(*a*)(1) may also include other components as are well-known in the art, including interconnection circuitry (not depicted).

Processing circuitry 74 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 76 may include one or more Ethernet cards, cellular modems, Fibre Channel (FC) adapters, Wireless Fidelity (Wi-Fi) wireless networking adapters, and/or other devices for connecting to a network 35. Network interface circuitry 76 allows the SP 38(*a*)(1) to communicate with SPs 38 of other DSAs 32, configuration management device 60, and remote client devices 70.

Storage interface circuitry 78 controls and provides access to persistent storage 40. Storage interface circuitry 78 may include, for example, SCSI, SAS, ATA, SATA, FC, M.2, and/or other similar controllers and ports.

Memory 80 may be any kind of digital system memory, such as, for example, random access memory (RAM). Memory 80 stores an operating system (OS, not depicted) in operation (e.g., a Linux, UNIX, Windows, MacOS, or similar operating system). Memory 80 also stores an input/output (I/O) stack 81 in operation. I/O stack 84 allows I/O requests (not depicted) from external hosts (as well as local applications, e.g., local client application 54 stored within memory 80 during operation) to be processed with respect to the persistent storage 40.

Memory 80 also stores Zeroconf-compatible Discovery Application 42 and clustered storage service 50 in operation. Zeroconf-compatible Discovery Application 42 is configured to store a set of state rules 44 and to maintain peer DB 48 that stores service and state information for all DSAs 32 on the local network 35 that announce services compatible with the clustered storage service 50. As depicted, in some embodiments, peer DB 48 may be arranged as a table having an address column 82 and a state column 84 and a set of entries 85 (depicted as entries 85(*a*), 85(*b*), . . . , 85(N)). Each entry 85 represents a particular DSA 32. Thus, as depicted, entry 85(*a*) represents DSA 32(*a*), its entry in column 82 is a link-local IP address assigned to SP 38(*a*)(1), and its entry in column 84 is the "configured" state. In addition, as depicted, entry 85(*b*) represents DSA 32(*b*), its entry in column 82 is a link-local IP address assigned to SP 38(*b*)(1), and its entry in column 84 is the "configuring" state. In addition, as depicted, entry 85(N) represents DSA 32(N), its entry in column 82 is a link-local IP address assigned to SP 38(N)(1), and its entry in column 84 is the "unconfigured" state. In some embodiments (not depicted), peer DB 48 may also have a column listing one or more services announced by each DSA 32.

Clustered storage service 50 operates to provide clustering support for storage so that more than one DSAs 32 can be clustered together to provide shared storage. Clustered storage service 50 stores various cluster configuration settings 52 (e.g., within a system registry). In some embodiments, as depicted, cluster configuration settings 52 include a cluster IP address 83, an IP address 86 specifically-assigned to the SP 38(*a*)(1), an IP address 87 of the peer SP 38(*a*)(2) within the same DSA 32(*a*), a list 88 of IP addresses of other DSAs 32 within the cluster, and a flag 89 indicating whether or not this SP 38(*a*)(1) is a master of the cluster.

There may also be other cluster configuration settings 52 as is well-known in the art. Typically, each of the IP addresses 83, 86, 87, 88 is a true L3 IP address rather than a link-local address.

Figure 3:
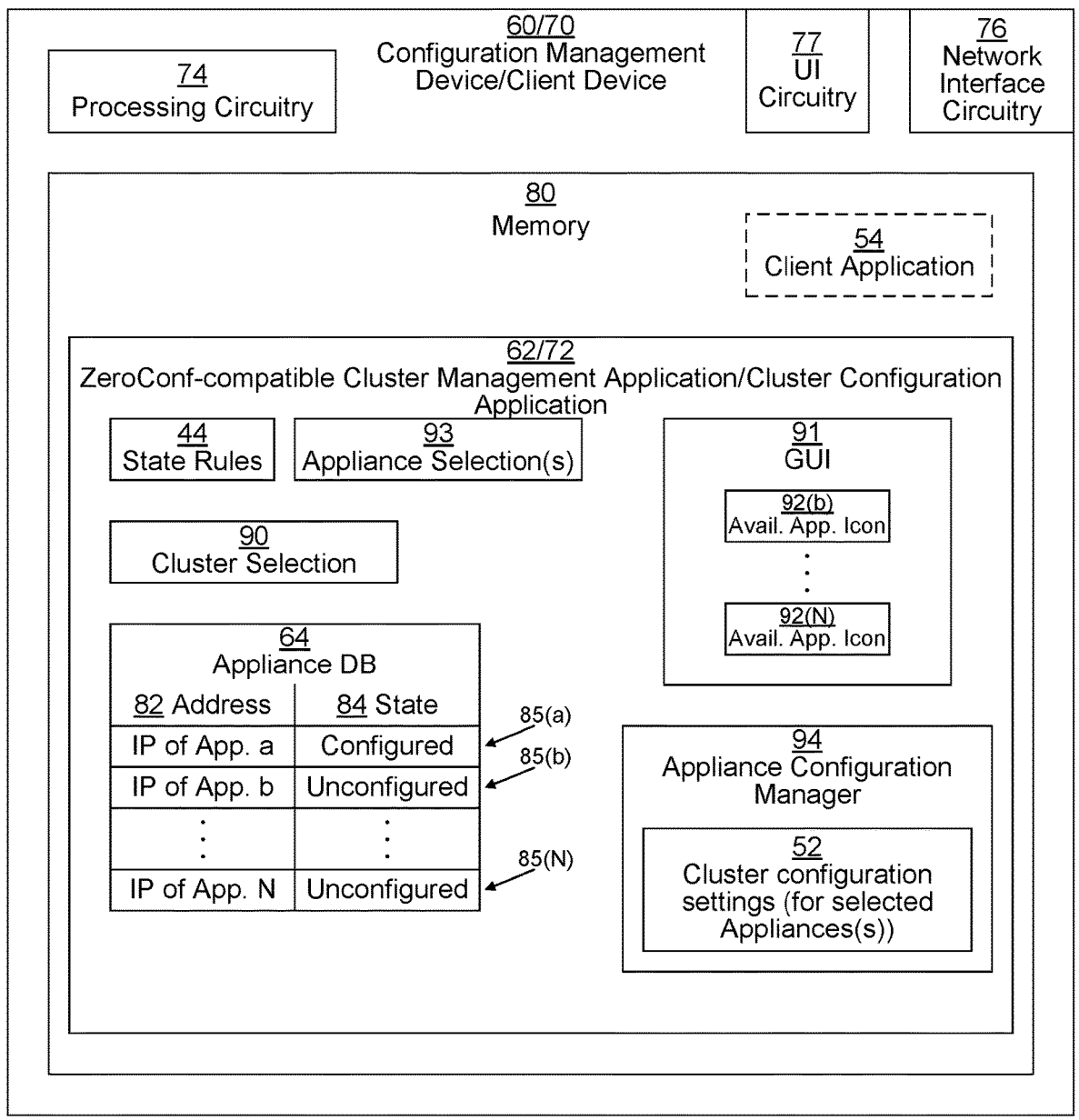
FIG. 3 is a block diagram depicting an example apparatus for use in connection with various embodiments.

FIG. 3 depicts an example configuration management device 60 or client device 70 that runs cluster configuration application 72 in more detail. Device 60, 70 includes processing circuitry 74, network interface circuitry 76, user interface (UI) circuitry 77, and memory 80. In some embodiments, SP 38(*a*)(1) may also include other components as are well-known in the art, including interconnection circuitry, storage interface circuitry, and persistent storage (not depicted).

UI circuitry 77 contains circuitry for interfacing with one or more UI devices (e.g., display 66 and other devices, not depicted) that allow one or more human agents (e.g., administrator 68) to input and receive data to and from the computing device 60, 70. For example, UI circuitry 77 may include a serial bus adapter, a graphics adapter, etc., while the other UI devices may include one or more of a printer, a speaker, and an input device (e.g., a mouse, trackpad, tracking stick, keyboard, keypad, microphone, biometric sensor, etc.).

Memory 80 stores an operating system (OS, not depicted) in operation (e.g., a Linux, UNIX, Windows, MacOS, or similar operating system). Memory 80 also stores either Zeroconf-compatible Cluster Management Application 62 (in the case of configuration management device 60) or cluster configuration application 72 (in the case of client device 70) in operation. Henceforth reference will only be made to Zeroconf-compatible Cluster Management Application (ZCCMA) 62 unless there is notable distinction.

ZCCMA 62 is configured to store a set of state rules 44 and to maintain the appliance DB 64 that stores service and state information for all DSAs 32 on the local network 35 that have announced services compatible with the clustered storage service 50. As depicted, in some embodiments, appliance DB 64 may be arranged as a table having an address column 82 and a state column 84 and a set of entries 85 (depicted as entries 85(*a*), 85(*b*), . . . , 85(N)). Each entry 85 represents a particular DSA 32. Thus, as depicted, entry 85(*a*) represents DSA 32(*a*), its entry in column 82 is a link-local IP address assigned to SP 38(*a*)(1), and its entry in column 84 is the "configured" state. In addition, as depicted, entry 85(*b*) represents DSA 32(*b*), its entry in column 82 is a link-local IP address assigned to SP 38(*b*)(1), and its entry in column 84 is the "unconfigured" state. In addition, as depicted, entry 85(N) represents DSA 32(N), its entry in column 82 is a link-local IP address assigned to SP 38(N)(1), and its entry in column 84 is the "unconfigured" state. In some embodiments (not depicted), appliance DB 64 may also have a column listing one or more services announced by each DSA 32.

Memory 80 also stores a graphical user interface (GUI) 91 in operation. GUI 91 operates to present a graphical display to administrator 68 on display 66. In one embodiment, GUI 91 includes a set of icons 92 (depicted as icons 92(*b*), . . . , 92(N)) representing DSAs 32 that are currently available to be added to a cluster (e.g., in an unreserved state). With reference to the appliance DB 64, since DSAs 32(*b*) and 32(N) are in the unreserved "unconfigured" state, icon 92(*b*) representing DSA 32(*b*) and icon 92(N) representing DSA 32(N) are displayed. The administrator 68 is then able to select one or more of these icons 92 in order to select the corresponding DSA 32 for joining a cluster, resulting in appliance selection(s) 93. Appliance selection(s) 93 thus represents the one or more DSAs 32 that have been selected by the administrator 68 to join a cluster indicated by a cluster selection 90.

Cluster selection 90 represents a cluster that the DSA(s) 32 indicated by the appliance selection(s) 93 is/are supposed to join. In the case of cluster configuration application 72 running on a client device 70 outside of local network 35, the cluster selection 90 represents a cluster that has already been configured to be accessible outside the local network 35, so the appliance selection(s) 93 represents (a) DSA(s) 32 that is/are supposed to join a preexisting cluster. In the case of ZCCMA 62 running on configuration management device 60 within local network 35, the cluster selection 90 may also represent a preexisting cluster as above, or it may represent a new cluster that has not yet been created.

Memory 80 also stores appliance configuration manager 94 in operation. Once an administrator 68 has finalized a command to add the DSA(s) 32 indicated by the appliance selection(s) 93 to the cluster indicated by the cluster selection 90, appliance configuration manager 94 interacts with each DSA(s) 32 indicated by the appliance selection(s) 93 to generate and send appropriate cluster configuration settings 52 for that DSA 32. In some embodiments, appliance configuration manager 94 also interacts with administrator 68 via GUI 91 as part of generating the appropriate cluster configuration settings 52 for one or more of the DSAs 32.

In the context of both FIG. 2 and FIG. 3, memory 80 may also store various other data structures used by the OS and various applications (e.g., Zeroconf-compatible discovery application 42, clustered storage service 50, client application 54, I/O stack 81, Zeroconf-compatible Cluster Management Application 62, cluster configuration application 72, GUI 91, appliance configuration manager 94, and other applications not depicted). In some embodiments, memory 80 may also include a persistent storage portion (not depicted). Persistent storage portion of memory 80 may be made up of one or more persistent storage devices, such as, for example, disks. Persistent storage portion of memory 80 or persistent storage 40 is configured to store programs and data even while the computing device 38, 60, 70 is powered off. The OS and applications (e.g., Zeroconf-compatible discovery application 42, clustered storage service 50, client application 54, I/O stack 81, Zeroconf-compatible Cluster Management Application 62, cluster configuration application 72, GUI 91, appliance configuration manager 94, and other applications not depicted) are typically stored in this persistent storage portion of memory 80 or on persistent storage 40 so that they may be loaded into a system portion of memory 80 from this persistent storage portion of memory 80 or persistent storage 40 upon a system restart or as needed. Zeroconf-compatible discovery application 42, clustered storage service 50, client application 54, I/O stack 81, Zeroconf-compatible Cluster Management Application 62, cluster configuration application 72, GUI 91, appliance configuration manager 94, or other applications not depicted, when stored in non-transient form either in the volatile portion of memory 80 or on persistent storage 80 or in persistent portion of memory 80, forms a computer program product. The processing circuitry 74 running one or more applications thus forms a specialized circuit constructed and arranged to carry out the various processes described herein.

Figure 4:
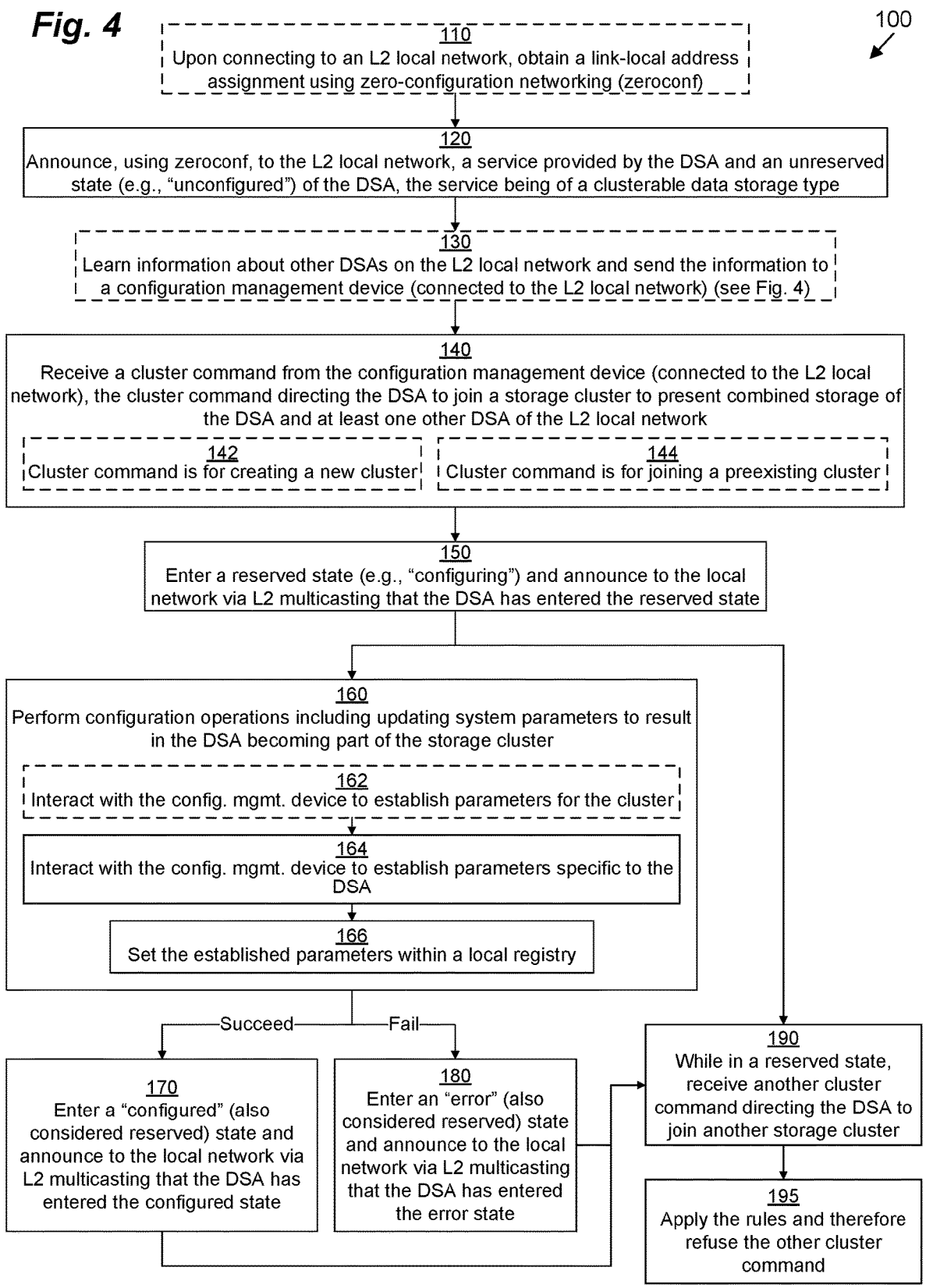
FIG. 4 is a flowchart depicting example methods according to various embodiments.

FIG. 4 illustrates an example method 100 performed by Zeroconf-compatible discovery application (ZCDA) 42 and clustered storage service 50 running on an SP 38 of a DSA 32 in conjunction with other applications for clustering data storage without conflict. It should be understood that any time a piece of software (e.g., Zeroconf-compatible discovery application 42, clustered storage service 50, client application 54, OS, I/O stack 81, Zeroconf-compatible Cluster Management Application 62, cluster configuration application 72, GUI 91, appliance configuration manager 94, etc.) is described as performing a method, process, step, or function, in actuality what is meant is that a computing device (e.g., SP 38, switch 34, configuration management device 60, client device 70, etc.) on which that piece of software is running performs the method, process, step, or function when executing that piece of software on its processing circuitry 74. It should be understood that one or more of the steps or sub-steps of method 100 may be omitted in some embodiments. Similarly, in some embodiments, one or more steps or sub-steps may be combined together or performed in a different order. Steps 110 and 130 and sub-steps 142, 144, and 162 of method 100 marked with dashed lines may be deemed to be either optional or representative of alternative embodiments. Method 100 is performed by an SP 38 of a DSA 32 in communication with SPs 38 of other DSAs 32 of the local network 35 and also either in communication with configuration management device 60 over local network 35 or client device 70 over L3 network 36.

In some embodiments, method 100 begins with step 110. In step 110, upon a DSA 32 (e.g., DSA 32(a)) first connecting to a local network 35, ZCDA 42 running on one of its SPs 38 (e.g., SP 38(a)(1)) obtains a link-local address assignment using zeroconf techniques as is well-known in the art. For example, ZCDA 42 running on SP 38(a)(1) might initially obtain a link-local IP address of 169.254.2.10.

Then, in step 120, ZCDA 42 announces using zeroconf, to the local network 35, a service provided by the DSA 32(a) and an unreserved state (e.g., "unconfigured") of the DSA 32(a), the service being of a clusterable data storage type. There may be several different types of clusterable data storage services. For example, in one embodiment, clustered storage service 50 is a Dell/EMC Cyclone clusterable storage service, while in another embodiment, clustered storage service 50 is another type of clusterable storage service. In some embodiments, the service announced to the local network 35 by ZCDA 42 using zeroconf has a name made up of a type identifier, a serial number of the DSA 32(a), and the state 46 of the DSA 32(a). Thus, an example service name for DSA 32(a) with serial number 12345 offering a Cyclone-based clustered storage service 50 might be "Cyclone_12345_Configured," while an example service name for DSA 32(N) with serial number 12987 offering a Cyclone-based clustered storage service 50 might be "Cyclone_12987_Unconfigured." Initially, all DSAs 32 are in an unreserved "unconfigured" state, so ZCDA 42 running on SP 38(a)(1) might announce a service of "Cyclone_12345_Unconfigured" from link-local IP address 169.254.2.10.

Then, in some embodiments, in step 130, ZCDA 42 learns information about other DSAs 32 (e.g., DSAs 32(b), . . . , 32(N)) on the local network 35 and sends the information to a configuration management device (e.g., in one embodiment over local network 35 to configuration management device 60 running ZCCMA 62, in another embodiment over L3 network 36 to client device 70 running cluster configuration application 72). See below in connection with FIG. 4 for further details.

Then, in step 140, ZCDA 42 receives a cluster command from the configuration management device (e.g., in one embodiment over local network 35 from configuration management device 60 running ZCCMA 62, in another embodiment over L3 network 36 from client device 70 running cluster configuration application 72), the cluster command directing the DSA 32(a) to join a storage cluster to present combined storage of the DSA 32(a) and at least one other DSA 32 (e.g., 32(b), . . . , 32(N)) of the local network 35. In sub-step 142, in some embodiments, when the configuration management device is configuration management device 60 running ZCCMA 62, the received cluster command is a command directing the DSA 32(a) to join/create a new storage cluster. In sub-step 144, in other embodiments, regardless of whether the configuration management device is configuration management device 60 running ZCCMA 62 or client device 70 running cluster configuration application 72, the received cluster command may be a command directing the DSA 32(a) to join a preexisting (pre-configured) storage cluster.

Then, in step 150, in response to receiving the command in step 140, DSA 32(a) enters a reserved state (e.g., "configuring") and announces to the local network 35 via L2 multicasting that the DSA 32(a) has entered the reserved state. So ZCDA 42 running on SP 38(a)(1) might announce a service of "Cyclone_12345_Configuring" from link-local IP address 169.254.2.10 in place of the previous announcement from DSA 32(a).

After step 150, normal operation of DSA 32(a) proceeds to step 160, however, it is possible for step 190 to also occur in parallel (or concurrently).

In step 160, DSA 32(a) performs configuration operations including updating system parameters (e.g., cluster configuration settings 52) to result in the DSA32(a) becoming part of the storage cluster. In some embodiments, step 150 may include sub-steps 162-166 or 164-166.

Sub-step 162 is performed when the cluster command is a command to create a new cluster (see above at sub-step 142). In sub-step 162, clustered storage service 50 running on SP 38(a)(1) interacts with ZCCMA 62 to establish parameter values for the new cluster (e.g., cluster IP address 83). In some embodiments, ZCCMA 62 further interacts with administrator 68 via GUI 91 to obtain these values.

Sub-step 164 is performed regardless of whether the cluster command is a command to create a new cluster (see above at sub-step 142) or to join a preexisting cluster (see above at sub-step 144). In sub-step 164, clustered storage service 50 running on SP 38(a)(1) interacts with ZCCMA 62 to establish parameter values specific to the DSA 32(a) (e.g., IP addresses 86, 87; flag 89, etc.). In some embodiments, ZCCMA 62 further interacts with administrator 68 via GUI 91 to obtain these values.

In sub-step 166, clustered storage service 50 sets the parameters 83, 86, 87, 88, 89, etc. within cluster configuration settings 52 as agreed-upon in sub-step 164 (and sub-step 162).

Once the configuration operations have concluded, if the configuration has succeeded, then operation proceeds with step 170. However, if the configuration has failed for some reason (e.g., the values of one or more of the cluster configuration settings 52 is inconsistent with reality; the peer DSAs 32 are not reachable, etc.), then operation instead proceeds with step 180. It should be noted that, in some embodiments (not depicted within FIG. 4), if the configuration operations time out without even having begun and without any errors occurring, the SP 38(a)(1) reverts to the unreserved "unconfigured" state.

In step170, upon successfully completing the configuration, DSA 32(a) enters a "configured" (also considered reserved) state and announces to the local network 35 via L2 multicasting that the DSA 32(a) has entered the configured state. Thus, for example, ZCDA 42 sets the state 46 to "configured" and might announce a service of "Cyclone_12345_Configured" from link-local IP address 169.254.2.10 in place of the previous announcement from DSA 32(*a*).

In step180, upon failing to successfully complete the configuration, DSA 32(*a*) enters an "error" (also considered reserved) state and announces to the local network 35 via L2 multicasting that the DSA 32(*a*) has entered the error state. Thus, for example, ZCDA 42 sets the state 46 to "error" and might announce a service of "Cyclone_12345_Error" from link-local IP address 169.254.2.10 in place of the previous announcement from DSA 32(*a*).

Step 190 may be performed if the state 46 is a reserved state (e.g., "configured," configuring," "error," etc.). In step 190, while in a reserved state, ZCDA 42 receives another cluster command directing the DSA 32(*a*) to join another storage cluster. Then, in step 195, ZCDA 42 checks the state rules 44 and determines that a state change from any reserved state directly to "configuring" is not allowed, so it rejects the other cluster command directing the DSA 32(*a*) to join the other storage cluster. See below in connection with FIG. 7.

Figure 5:
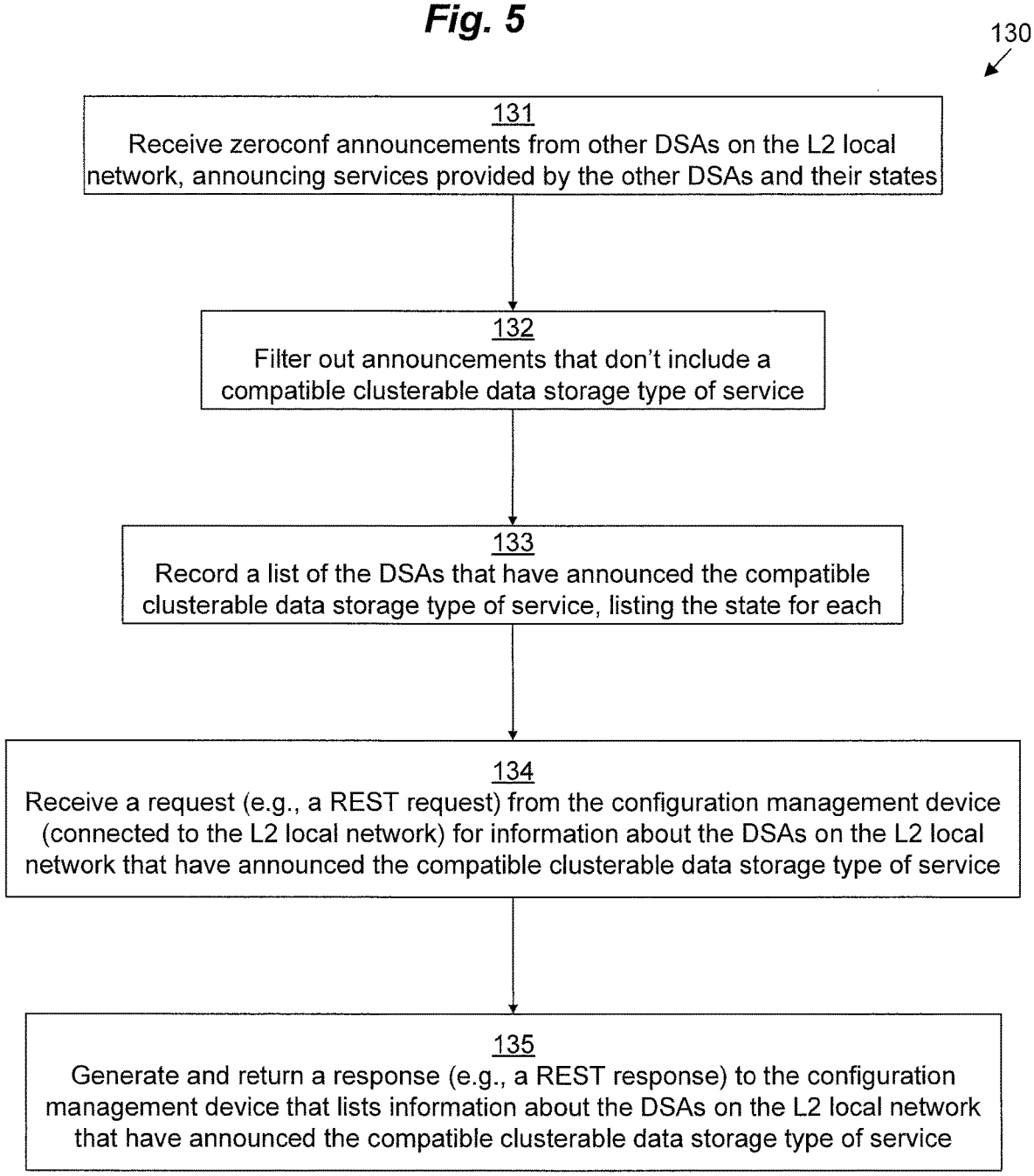
FIG. 5 is a flowchart depicting an example method according to various embodiments.

FIG. 5 illustrates an example method detailing step 130 of method 100 performed by ZCDA 42 running on an SP 38 of a DSA 32 in conjunction with other applications for apprising either configuration management device 60 or client device 70 about the other DSAs 32 installed on local network 35. It should be understood that one or more of the sub-steps of step 130 may be omitted in some embodiments. Similarly, in some embodiments, one or more sub-steps may be combined together or performed in a different order. Step 130 is performed by an SP 38 (e.g., 38(*a*)(1)) of a DSA 32 (e.g., 32(*a*)) in communication with SPs 38 of other DSAs 32 of the local network 35 and also either in communication with configuration management device 60 over local network 35 or client device 70 over L3 network 36.

In sub-step 131, ZCDA 42 running on SP 38(*a*)(1) receives zeroconf announcements from other DSAs 32 on the local network 35 that announce services provided by the other DSAs 32 and their states 46. Thus, for example, in the context of the example of FIG. 2, ZCDA 42 running on SP 38(*a*)(1) may receive L2 multicast messages from SPs 38(*b*)(1) and 38(N)(1) advertising services that they each provide and their respective states. If, for example, SPs 38(*b*)(1) has serial number 12399 and link-local IP address 169.254.2.11 and SP 38(N)(1) has serial number 12987 and link-local IP address 169.254.3.23 and both provide a Cyclone clustering service, then ZCDA 42 might receive an announcement of a service of "Cyclone_12399_ Configuring" from link-local IP address 169.254.2.11 and an announcement of a service of "Cyclone_12987_ Unconfigured" from link-local IP address 169.254.3.23.

In sub-step 132, ZCDA 42 running on SP 38(*a*)(1) filters out announcements that don't include a compatible clusterable data storage type of service. Thus, for example, ZCDA 42 may search the list of services for the word "Cyclone," rejecting any DSAs 32 that don't provide a service with the word "Cyclone" as a part of their service name.

In sub-step 133, ZCDA 42 running on SP 38(*a*)(1) records a list of the DSAs 32 that have announced the compatible clusterable data storage type of service, listing the state 46 for each. Thus, in an example embodiment, ZCDA 42 creates an entry 85 within peer DB 42 for each service name that passed through the filter of sub-step 132. ZCDA 42 extracts the state 46 encoded at the end of each such service name, saving it in the state column 84 for that entry 85. ZCDA 42 also stores the link-local IP address from which each announced service name came and stores it in the address column of the respective entry 85. ZCDA 42 may also store the state 46 and link-local IP address of the SP 38(*a*)(1) on which it is running within columns 84 and 86, respectively of an entry dedicated to DSA 32(*a*).

In sub-step 134, ZCDA 42 running on SP 38(*a*)(1) receives a request from the configuration management device (e.g., in one embodiment over local network 35 from configuration management device 60 running ZCCMA 62, in another embodiment over L3 network 36 from client device 70 running cluster configuration application 72) for information about the DSAs 32 on the local network 35 that have announced the compatible clusterable data storage type of service (e.g., Cyclone, etc.). In one embodiment, the request is a Representational State Transfer (REST)-compliant web request.

In response, in sub-step 135, ZCDA 42 running on SP 38(*a*)(1) generates and returns a response (e.g., a RESTful response) back to the configuration management device (e.g., configuration management device 60 running ZCCMA 62, client device 70 running cluster configuration application 72) that lists information about the DSAs 32 on the local network 35 that have announced the compatible clusterable data storage type of service. In an example embodiment, the following is illustrative of the format of the RESTful response:

```
{
    "unconfigured": [
        {
            "applianceSSN": "12399",
            "serviceName": "Cyclone_12399_Unconfigured",
            "linkLocalIP": "169.254.2.11"
        },
        {
            "applianceSSN": "12987",
            "serviceName": "Cyclone_12987_Unconfigured",
            "linkLocalIP": "169.254.3.23"
        }
    ],
    "managed": [
        [
            {
                "applianceSSN": "12345",
                "serviceName": "Cyclone_12345_Configured",
                "linkLocalIP": "169.254. 2.10",
                "isMaster": true,
                "clusterName": "Cluster1"
            },
            {
                "applianceSSN": "12346",
                "serviceName": "Cyclone_12346_Unconfigured",
                "linkLocalIP": "169.254. 2.20",
                "isMaster": false
            },
        ],
        [
            {
                "applianceSSN": "12347",
                "serviceName": "Cyclone_12347_Configured",
                "linkLocalIP": "169.254. 2.30",
                "isMaster": true,
                "clusterName": "Cluster2"
            },
            {
                "applianceSSN": "12348",
                "serviceName": "Cyclone_12348_Unconfigured",
                "linkLocalIP": "169.254. 2.31",
                "isMaster": false
            },
        ]
    ]
}
```

In the above example RESTful response, six DSAs 32 that all use a Cyclone service are described:
(1) DSA 32(b) with serial number 12399 has linkLocal IP address 169.254.2.11 and is unconfigured.
(2) DSA 32(N) with serial number 12987 has linkLocal IP address 169.254.3.23 and is unconfigured.
(3) DSA 32(a) with serial number 12345 has linkLocal IP address 169.254.2.10 and is configured as the master of a storage cluster called Cluster1.
(4) A previously-undescribed DSA 32 with serial number 12346 has linkLocal IP address 169.254.2.20 and is configured as a non-master member of the storage cluster called Cluster1.
(5) A previously-undescribed DSA 32 with serial number 12347 has linkLocal IP address 169.254.2.30 and is configured as the master of a storage cluster called Cluster2.
(6) A previously-undescribed DSA 32 with serial number 12348 has linkLocal IP address 169.254.2.31 and is configured as a non-master member of the storage cluster called Cluster2.

Figure 6:
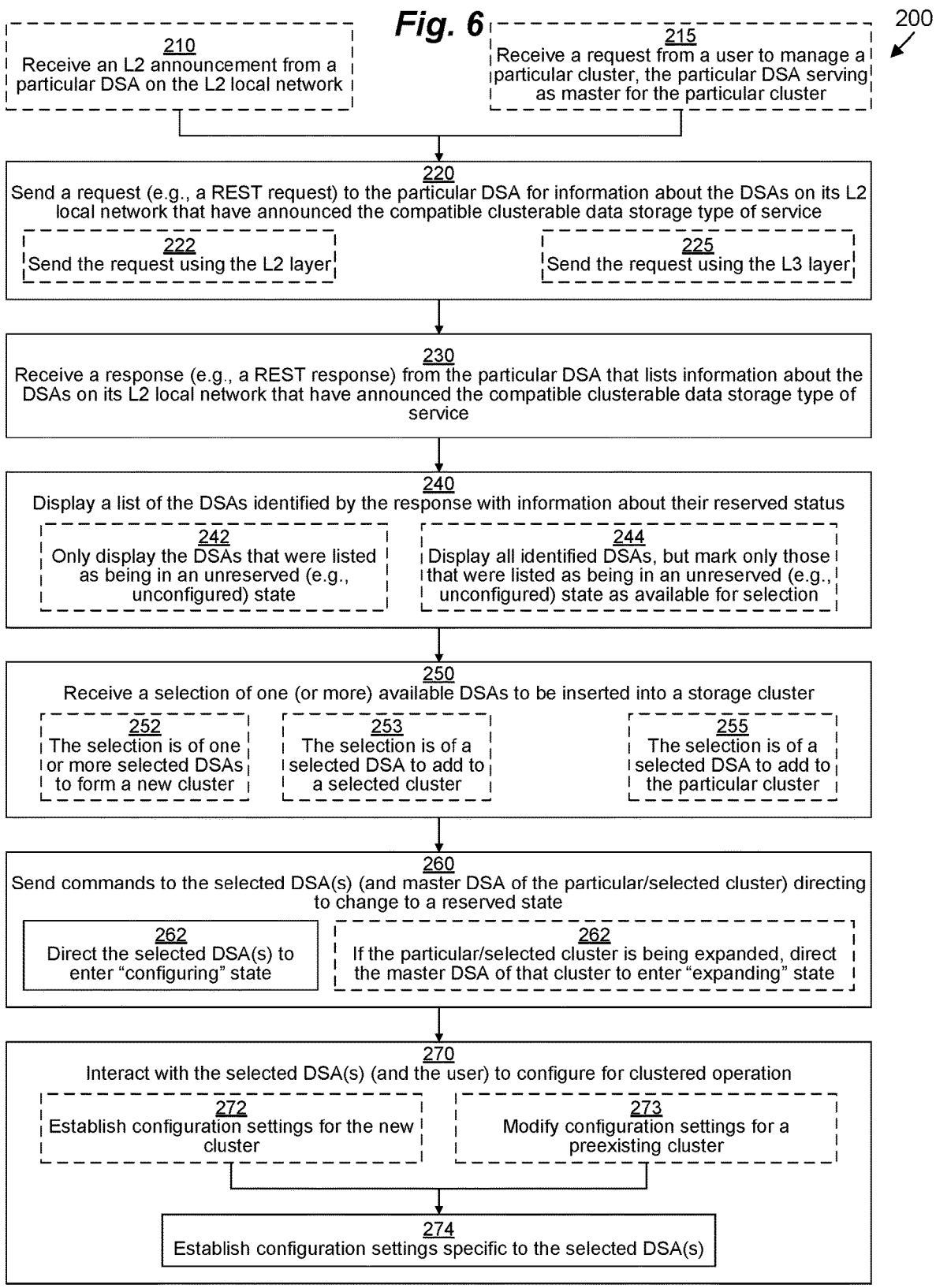
FIG. 6 is a flowchart depicting example methods according to various embodiments.

FIG. 6 illustrates an example method 200 performed by either ZCCMA 62 running on configuration management device 60 or cluster configuration application 72 running on client device 70 in conjunction with other applications for learning about and then configuring DSAs 32 within storage clusters. It should be understood that one or more of the steps or sub-steps of method 200 may be omitted in some embodiments. Similarly, in some embodiments, one or more steps or sub-steps may be combined together or performed in a different order. Steps 210 and 215 and sub-steps 222, 225, 242, 244, 252, 253, 255, 262, 272, and 273 of method 200 marked with dashed lines may be deemed to be either optional or representative of alternative embodiments. Method 200 is performed by either configuration management device 60 or client device 70 in communication with an SP 38 of at least one DSA 32 over network 35 or 36. Method 200 may be performed by configuration management device 60 or client device 70 in concert with method 100 performed by a DSA 32.

Method 200 begins either with step 210 or step 215, depending on the embodiment. In embodiments in which method 200 is performed by ZCCMA 62 running on configuration management device 60, step 210 is performed. In other embodiments in which method 200 is performed by cluster configuration application 72 running on client device 70, step 215 is performed instead.

In step 210, ZCCMA 62 receives an L2 announcement from at least one DSA 32 (e.g., particular DSA 32(a)) on the local network 35. See step 120 above.

In step 215, cluster configuration application 72 receives a request from an administrator 68 to manage a particular cluster (which has already been configured to be accessible to the L3 network 36), a particular DSA 32(a) serving as master for that particular cluster.

In response to the particular DSA 32(a) being identified in either step 210 or 215, in step 220, ZCCMA 62 (or cluster configuration application 72 but henceforth reference to ZCCMA 62 will also refer to cluster configuration application 72 unless excluded explicitly) sends a request (e.g., a RESTful request) to the particular DSA 32(a) for information about the DSAs 32 on its local network 35 that have announced the compatible clusterable data storage type of service (e.g., Cyclone). See step 134 above. In embodiments in which method 200 is performed by ZCCMA 62 running on configuration management device 60, step 220 includes sub-step 222 in which performance includes sending the request over local network 35 using the link-local IP address of the particular DSA 32(a). In other embodiments in which method 200 is performed by cluster configuration application 72 running on client device 70, step 220 includes sub-step 225 in which performance includes sending the request over L3 network 36 using the an L3 IP address of the particular DSA 32(a).

In response to step 220, in step 230, ZCCMA 62 receives a response (e.g., a RESTful response) from the particular DSA 32(a) that lists information about the DSAs 32 on its L2 local network that have announced the compatible clusterable data storage type of service. See step 135 above. Upon receipt, the information from the response may be stored within appliance DB 64.

In response to step 230, in step 240, ZCCMA 62 displays, using GUI 91, on display device 66, a list of the DSAs 32 identified by the response from step 230 with information about their reserved status. For example, in one embodiment, as described by sub-step 242, GUI 91 displays icons 92 for all available DSAs 32 (being available means that those DSAs 32 have been listed in column 84 of appliance DB 64 as having a state 46 that is unreserved, such as "unconfigured") but not for other DSAs 32 that are not available. In another example embodiment, as described by sub-step 244, GUI 91 displays markers for all DSAs 32 stored in the appliance DB 64, but only icons 92 for the available DSAs 32 are selectable by an administrator 68. The unavailable DSAs 32 may be identified on-screen as being unavailable or as being in particular states aside from "unconfigured." These unavailable DSAs 32 may be marked in a greyed-out manner to indicate that they are not user-selectable.

Then, in step 250, ZCCMA 62 receives a selection of one (or more) available DSAs 32 to be inserted into a storage cluster. For example, in some embodiments, this step may involve receiving mouse input via UI 77 indicating which icon(s) 91 the administrator 68 has selected. The selection is stored as appliance selection(s) 93.

In embodiments in which method 200 is performed by ZCCMA 62 running on configuration management device 60, step 250 includes either sub-step 252 or 253. In sub-step 252, the appliance selections 93 represent DSAs 32 that are intended to be joined together into a new cluster. In sub-step 253, the appliance selection 93 represents one DSA 32 that is intended to be added to a particular preexisting cluster that the administrator 68 also selects as part of step 250.

In other embodiments in which method 200 is performed by cluster configuration application 72 running on client device 70, step 220 includes sub-step 255. In sub-step 255, the appliance selection 93 represents one DSA 32 that is intended to be added to the particular preexisting cluster that the administrator 68 previously selected as part of step 215.

Upon receiving the appliance selection(s) 93 from step 250, step 260 is performed. In step 260, ZCCMA 62 sends a command to each selected DSA 32 (and to a master DSA 32 of the particular/selected cluster) directing that DSA 32 to change its state 46 to be reserved. As part of step 260, in sub-step 260, ZCCMA 62 directs each selected DSA 32 to temporarily change its state to "configuring. See steps 140 and 150 above. When the appliance selection 93 represents an expansion of a preexisting cluster (i.e., if sub-step 253 or 255 was performed), step 260 also includes sub-step 262. In sub-step 262, ZCCMA 62 directs the master DSA 32 of the particular preexisting cluster that the administrator 68 selected to temporarily change its state 46 from "configured" to "expanding," which is also a reserved state.

Finally, in step 270, appliance configuration manager 94 interacts with each of the selected DSAs 32 (as well as the master DSA 32 of the particular preexisting cluster that the administrator 68 selected) to cause that DSA 32 to be configured for clustered operation as requested by the administrator 68. In some embodiments, step 270 may also include the appliance configuration manager 94 interacting with the administrator 68 via GUI 91. As part of step 270, appliance configuration manager 94 may perform zero or one of sub-steps 272, 273 followed by sub-step 274.

When the appliance selection 93 represents joining DSAs 32 together into a new cluster (see sub-step 252 above), sub-step 272 is performed. In sub-step 272, appliance configuration manager 94 establishes values for those cluster configuration settings 52 that are needed to set up a new cluster (e.g., cluster IP address 83 and setting the flag 89 to true for the master DSA 32 of the new cluster). See sub-step 162 above.

In sub-step 273, appliance configuration manager 94 modifies values for those cluster configuration settings 52 that affect the entire cluster (e.g., IP addresses 88). See sub-step 162 above.

In sub-step 274, appliance configuration manager 94 establishes values for those cluster configuration settings 52 that are specific to particular DSAs 32 that are joining a cluster (whether new or preexisting) (e.g., IP addresses 86, 87 and setting the flag 89 to false for the DSAs 32 aside from the master DSA 32 of the new cluster). See sub-step 164 above.

Figure 7:
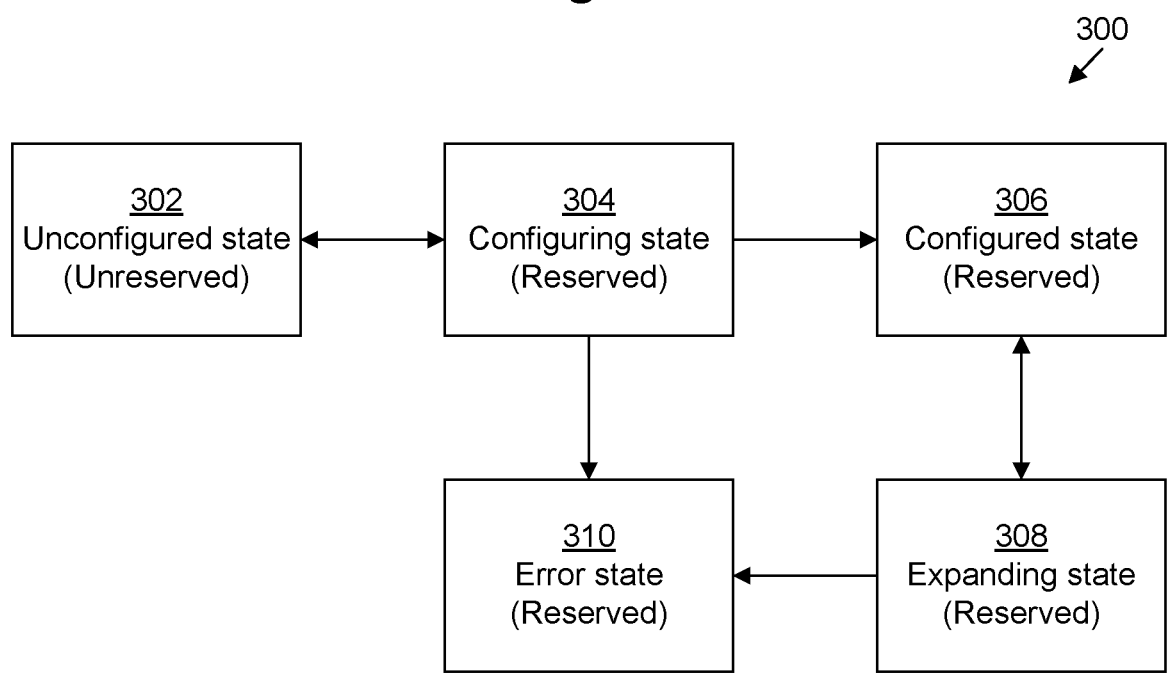
FIG. 7 is a state transition diagram depicting an example set of rules for state transitions.

FIG. 7 is an example state transition diagram 300 based on the state rules 44.

As depicted in FIG. 7, a DSA 32 in the unconfigured state 302 (which is unreserved) may transition only to the configuring state 304 (which is reserved). See step 150 and sub-step 262 above.

A DSA 32 in the configuring state 304 may transition to one of the unconfigured state 302 (if the configuration operations time out without even having begun), the configured state 306 (if the configuration completes successfully; see step 170 above), or the error state 310 (if the configuration fails; see step 180 above).

A DSA 32 in the configured state 306 may transition only to the expanding state 308, and even then only if it happens to be the master of a cluster. A non-master DSA 32 remains in state 306 unless it either happens to become the master due to a failover or an administrator 68 manually resets it to remove it from its cluster.

A DSA 32 in the expanding state 308 may transition to one of the configured state 306 (if the configuration completes successfully), or the error state 310 (if the configuration fails).

A DSA 32 in the error state 310 remains in that state until an administrator 68 manually removes it from that state (typically while correcting the error).

States 304, 306, 308, and 310 are all considered reserved states, so if a DSA 32 in one of those states receives a cluster command, it must refuse that command. See steps 190-195 above. This prevents multiple administrators 68 from causing problems by attempting to add the same DSA 32 to different clusters at around the same time and other similar problems.

Thus, techniques have been presented for pre-configuring data storage systems 32 to automatically self-initialize upon connecting to a physical network 35 and to minimize the amount of expert configuration needed while the administrator 68 is connected to the physical network 35. This result may be accomplished by utilizing zeroconf techniques to initialize each data storage system 32 with a link local address and to announce that it is available for clustered data storage. However, since configuration of each data storage system 32 to join a cluster can still take several minutes, to ensure that there are no conflicts between multiple users 68 attempting to configure clusters simultaneously, each data storage system 32 is also pre-configured to announce its cluster configuration state 46 to the local network 35 and to immediately change its cluster configuration state 46 to a reserved state upon being selected to join a cluster. Rules 44 can be implemented to prevent a data storage system 32 in a reserved cluster configuration state from being permitted to join another cluster. In addition, because each data storage system 32 announces its availability and its cluster configuration state 46, a device 60 attached to the local network 35 is able to display a list of all data storage systems 32 on the local network 35 available to join a new or preexisting storage cluster. A user 68 is then easily able to select one or more available data storage systems 32 to initiate a new cluster or to join a preexisting cluster. In addition, once a cluster is initialized, a user 68 on a layer 3 network 36 (i.e., not limited to just the local physical network 35) is able to access a data storage system 32 of that cluster and to view all data storage systems 32 (using icons 92) that are currently available to join that cluster. The user 68 can also add such an available data storage system 32 to a cluster even when not directly connected to the physical local network 35.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of clustering data storage performed by a data storage apparatus (DSA), the method comprising:
    announcing, using zero-configuration networking (zeroconf), to a Layer 2 (L2) local network, a service provided by the DSA and an unreserved state of the DSA, the service being of a clusterable data storage type;
    receiving a cluster command from a configuration management device connected to the L2 local network, the cluster command directing the DSA to join a storage cluster to present combined storage of the DSA and at least one other DSA on the L2 local network; and
    in response to receiving the cluster command:
        announcing to the local network via L2 multicasting that the DSA has entered a reserved state using zeroconf;
        after announcing that the DSA has entered the reserved state, performing configuration operations including updating system parameters, resulting in the DSA becoming part of the storage cluster; and
        while in the reserved state, receiving another cluster command directing the DSA to join another storage cluster, and, in response, refusing the other cluster command.

2. The method of claim 1,
    wherein the method further comprises, upon connecting to the L2 local network, obtaining a link-local address assignment using zeroconf; and
    wherein announcing the service provided by the DSA to the L2 local network using zeroconf includes announcing to the local network via L2 multicasting that a device with the obtained link-local address assignment provides the service.

3. The method of claim 1 wherein the method further comprises:
    receiving, via zeroconf, announcements from other DSAs on the L2 local network that have announced services of the same clusterable storage service type;
    recording states of the other DSAs on the L2 local network that have announced services of the same clusterable storage service type as indicated by the received announcements, the recorded states indicating whether or not each of the other DSAs is in a reserved state or an unreserved state; and
    prior to receiving the cluster command, sending a list of the other DSAs that are in the unreserved state to the configuration management device via the local network.

4. The method of claim 1 wherein updating system parameters includes setting a Layer 3 (L3) address of the DSA through which the combined storage can be accessed.

5. The method of claim 1,
    wherein the cluster command further directs the DSA to create the storage cluster;
    wherein performing configuration operations further includes creating new parameters for the storage cluster.

6. The method of claim 5 wherein the method further comprises:
    receiving yet another cluster command, the other cluster command directing the DSA to add yet another DSA on the L2 local network to the storage cluster to present combined storage of the DSA, the at least one other DSA, and the yet other DSA; and
    in response to receiving the other cluster command:
        announcing to the local network via L2 multicasting that the DSA has entered another reserved state using zeroconf, the other reserved state being an expansion state;
        after announcing that the DSA has entered the other reserved state, performing additional configuration operations including further updating system parameters in order for the yet other DSA to become part of the storage cluster; and
        while in the other reserved state, receiving still another cluster command, and, in response, refusing the still other cluster command.

7. The method of claim 6,
    wherein performing the additional configuration operations results in an error, failing to cause the yet other DSA to become part of the storage cluster;
    wherein the method further comprises, in response to the error, announcing to the local network via L2 multicasting that the DSA has entered yet another reserved state using zeroconf, the yet other reserved state being an error state; and
    while in the error state, receiving a final cluster command, and, in response, refusing the final cluster command.

8. The method of claim 6 wherein the other cluster command is received from the configuration management device connected to the L2 local network.

9. The method of claim 6 wherein the other cluster command is received from a remote configuration management device not directly connected to the L2 local network, the remote configuration management device being connected to a Layer 3 (L3) network.

10. A computer program product comprising a non-transitory computer-readable storage medium storage a set of instructions, which, when performed by a data storage computing device (DSCD), cause the DSCD to initiate clustering of data storage by:
    announcing, using zero-configuration networking (zeroconf), to a Layer 2 (L2) local network, a service provided by the DSCD and an unreserved state of the DSCD, the service being of a clusterable data storage type;
    receiving a cluster command from a configuration management device connected to the L2 local network, the cluster command directing the DSCD to join a storage cluster to present combined storage of the DSCD and at least one other DSCD on the L2 local network; and
    in response to receiving the cluster command:
        announcing to the local network via L2 multicasting that the DSCD has entered a reserved state using zeroconf;
        after announcing that the DSCD has entered the reserved state, performing configuration operations including updating system parameters, resulting in the DSCD becoming part of the storage cluster; and while in the reserved state, receiving another cluster command directing the DSCD to join another storage cluster, and, in response, refusing the other cluster command.

11. The computer program product of claim 10,
wherein the set of instructions, when performed by the DSCD, further causes the DSCD to, upon connecting to the L2 local network, obtain a link-local address assignment using zeroconf; and
wherein announcing the service provided by the DSCD to the L2 local network using zeroconf includes announcing to the local network via L2 multicasting that a device with the obtained link-local address assignment provides the service.

12. The computer program product of claim 10 wherein the set of instructions, when performed by the DSCD, further causes the DSCD to perform the following operations:
receiving, via zeroconf, announcements from other DSCDs on the L2 local network that have announced services of the same clusterable storage service type;
recording states of the other DSCDs on the L2 local network that have announced services of the same clusterable storage service type as indicated by the received announcements, the recorded states indicating whether or not each of the other DSCDs is in a reserved state or an unreserved state; and
prior to receiving the cluster command, sending a list of the other DSCDs that are in the unreserved state to the configuration management device via the local network.

13. The computer program product of claim 10 wherein updating system parameters includes setting a Layer 3 (L3) address of the DSCD through which the combined storage can be accessed.

14. The computer program product of claim 10,
wherein the cluster command further directs the DSCD to create the storage cluster;
wherein performing configuration operations further includes creating new parameters for the storage cluster.

15. The computer program product of claim 14 wherein the set of instructions, when performed by the DSCD, further causes the DSCD to perform the following operations:
receiving yet another cluster command, the other cluster command directing the DSCD to add yet another DSCD on the L2 local network to the storage cluster to present combined storage of the DSCD, the at least one other DSCD, and the yet other DSCD; and
in response to receiving the other cluster command:
announcing to the local network via L2 multicasting that the DSCD has entered another reserved state using zeroconf, the other reserved state being an expansion state;
after announcing that the DSCD has entered the other reserved state, performing additional configuration operations including further updating system parameters in order for the yet other DSCD to become part of the storage cluster; and
while in the other reserved state, receiving still another cluster command, and, in response, refusing the still other cluster command.

16. The computer program product of claim 15,
wherein performing the additional configuration operations results in an error, failing to cause the yet other DSCD to become part of the storage cluster;
wherein the method further comprises, in response to the error, announcing to the local network via L2 multicasting that the DSCD has entered yet another reserved state using zeroconf, the yet other reserved state being an error state; and
while in the error state, receiving a final cluster command, and, in response, refusing the final cluster command.

17. A method of configuring data storage apparatuses (DSAs) performed by a configuration management device, the method comprising:
sending a request via a layer 2 (L2) local network to a DSA in an unreserved state to return a list of other DSAs that are in the unreserved state, the DSA providing a service of a clusterable data storage type;
receiving, via the L2 local network, the list of the other DSAs that are in the unreserved state from the DSA;
displaying the list of the other DSAs that are in the unreserved state to a user;
receiving, via a user interface, a selection of DSAs in the unreserved state that the user wishes to join the storage cluster, the selection including the DSA and at least one other DSA from the list;
sending a cluster command to the DSA in response to receiving the selection from the user interface, the duster command directing the DSA to join a storage cluster to present combined storage of the DSA and at least one other DSA on the L2 local network; and
interacting with the DSA and the at least one other DSA to cause the DSA and the at least one other DSA to become configured for clustered operation.

* * * * *